March 23, 1965     R. A. FRYE     3,174,274
ROTARY ENGINE Filed Dec. 13, 1961     5 Sheets-Sheet 1

INVENTOR.
Reinhold A. Frye
BY Norman H. Popper
ATTORNEY

March 23, 1965

R. A. FRYE

3,174,274

ROTARY ENGINE

Filed Dec. 13, 1961

INVENTOR.
Reinhold A. Frye
BY Norman N. Popper
ATTORNEY

Fig. 10

INVENTOR.
Reinhold A. Frye

United States Patent Office 3,174,274
Patented Mar. 23, 1965

3,174,274
ROTARY ENGINE
Reinhold A. Frye, Little Falls, N.J.
(1239 Peach Grove Lane, Vista, Calif.)
Filed Dec. 13, 1961, Ser. No. 158,966
11 Claims. (Cl. 60—1)

My invention relates generally to rotary engines and specifically to a rotary engine employing a plurality of impellers some of which have a modified or cropped cycloidal configuration and others have a regular cycloidal configuration.

The rotary engine has many advantages over the conventional reciprocating piston internal combustion engine. Specifically, the rotary engine eliminates power losses encountered when accelerating reciprocating parts and, in addition, eliminates the necessity for a flywheel to store kinetic energy, permits vastly increased operating speeds, provides an increased number of power strokes per engine revolution, and vastly increases both total power output and the power output per unit of engine displacement and per unit of weight.

Many types of rotary engines have been proposed, but none have been found to be practical, principally because actual power output is substantially below that theoretically predicted. In many instances, available energy has been wasted by exhausting gases of the burned fuel charge at relatively high pressures and temperatures thereby wasting enormous portions of the available enthalpic change. In my invention there is a maximum use of the potential energy available in the enthalpic change which is converted directly to kinetic energy by reason of the structure of the respective impellers and their functional interrelationship.

Therefore, it is among the objects and advantages of my invention to provide a rotary engine in which there is a maximum conversion of available potential energy into kinetic energy.

Another object of my invention is to provide a rotary engine in which the potential and kinetic energy of partially escaping exhaust gases is converted into kinetic energy of rotating engine members.

Yet another object of my invention is to provide a rotary engine in which no lubricant or liquid seal is necessary between the impellers and engine block or housing.

A further object of my invention is to provide a rotary engine employing a plurality of meshed impellers at least two of which have a modified or cropped cycloidal form.

Still a further object of my invention is to provide a rotary engine employing a plurality of meshed impellers to develop a two stage compression of a charge of air and fuel and deliver it directly to a combustion chamber.

Still another object of my invention is to proivde a rotary engine in which successive charges of fuel are ignited by the heat of exhaust gases after the initial charge of fuel is ignited by either a conventional spark plug or glow plug.

Yet a further object of my invention is to provide a rotary engine in which a plurality of meshed impellers provide both precompression of the charge of fuel and air prior to ignition and expulsion of exhaust gases from the combustion chamber after ignition.

Another object of my invention is to provide a rotary engine in which the engine impellers are provided with a labyrinth-type structural seal which is adapted to convert the energy of escaping exhaust gases into kinetic energy of the rotating impellers.

Still another object of my invention is to provide a rotary engine employing a plurality of rotating impellers some of which have a regular cycloidal form and others of which have a cropped or turned cycloidal form thereby providing for a precise time-phase relationship between intake, precompresion, final compression, combustion and exhaust phases of engine operation by the angular orientation of the impellers about their respective centers of rotation.

These objects and advantages as well as other objects and advantages may be achieved by my invention, one embodiment of which is illustrated in the drawings in which.

Referring now to the drawings in detail, my engine comprises a block 11 having trapeziodal or irregular hexagonal peripheral configuration. The block 11 is provided with six overlapping bores 12, 13, 14, 15, 16 and 17 whose respective axes are parallel to each other and perpendicular to the plane of the block 11. A generally flat, front or top head 18 is bolted onto the block 11 on one side thereof, and a generally flat rear head or bottom 19 is bolted onto its opposite side. Both the front head 18, the block 11 and rear head 19 are provided with a plurality of cooling fins 20 positioned generally parallel to each other and perpendicular to the end of the block 11 and lying in the vicinity of bores 13, 14, 15 and 16. The block 11 is also provided with two pairs of exhaust ports 21, 21 and 22, 22 communicating respectively with bores 14 and 15. The block 11 is also provided with a pair of air intake ports 23 and 24 communicating respectively with bores 12 and 13 and 16 and 17.

The rear head 19 is provided with six shaft bores 25, 26, 27, 28, 29 and 30 positioned concentrically with, respectively, block bores 12, 13, 14, 15, 16 and 17. Mounted for rotation within shaft bores 25, 26, 27, 28, 29 and 30 are, respectively, impeller mounting shafts 31, 32, 33, 34, 35 and 36. Each of the impeller mounting shafts extends into its respective bore in the block 11 and through and beyond the rear head 19. The end of each impeller mounting shaft extending beyond the rear head 19 is engaged with a gear, respectively, 37, 38, 39, 40, 41 and 42 adapted to rotate with the shaft to which it is secured. Each of the gears 37, 38, 39, 40, 41 and 42 is engaged to the gear immediately adjacent to it beginning with gear 37 and ending with gear 42, gears 37 and 42 not being engaged with each other. Shaft 33 is provided with a smaller gear 43 secured to its end and adapted to rotate therewith. The block 11 is also provided with a shaft bore 44 in which a shaft 45 is freely mounted for rotation. Shaft 45 extends through a second bore 46 in the rear head 19 and is provided with a large drive gear 47 at its end adapted to rotate therewith and engaged to gear 43 mounted on shaft 33. A cover 48 is bolted to the head 19 to conceal the various gears hereinabove referred to. However shafts 45 extends through the cover 48 as a power takeoff.

The front head 18 is provided with six bores 49, 49, etc. concentric with the respective block bores 12, 13, 14, 15, 16 and 17 and adapted to receive shafts 50, 50, etc. rotatably mounted therein. The front head 19 is also provided with a pair of bores 51 and 52 for mounting of a fuel injector unit 53. Bores 51 and 52 respectively communicate with bores 14 and 15 in the block 11. In addition, the front head 18 is provided with a pair of tapped bores 54 and 55 communicating respectively with block bores 14 and 15 to accommodate conventional spark plugs or glow plugs 56. The exterior surface of the front head 18 is provided with a counterbored recess 57 concentric with each of the shaft bores 49 to accommodate a shaft support bearing 58. Similarly, the exterior surface of the rear head 19 is provided with a plurality of counterbored recesses 59 concentric with the respective shaft bores 25, 26, 27, 28, 29 and 30 to accommodate shaft support bearings 60. Compressor or blower impellers 61, 62, 63 and 64 are rotatably mounted within the block bores 12, 13, 16 and 17 respectively. Each of the said compressor impellers 61, 62, 63 and 64 is mounted for rotation on respectively, shafts 36, 35, 32 and 31 which extend through the rear head 19 and shaft 50, 50, etc. extending through the front head 18. For convenience, the respective compressor impellers may be made integral with the respective mounting shafts. Each of the compressor impellers 61, 62, 63 and 64 is provided with two lobes displaced from one another by 180° with the front and rear face 65 and 66 respectively of each impeller being flat and parallel with each other. The contour of the lobes of the respective compressor impellers are defined by a pair of opposed, epicycloidal curves joined smoothly by a pair of opposed hypocycloidal curves. The diameter of each of the block bores 12, 13, 16 and 17 is slightly greater than the longitudinal or long diameter of each of the respective compressor impellers to provide a minimum clearance. Each of the said compressor impellers is provided with a plurality of straight, generally parallel semi-circular grooves 67, 67 etc. positioned transversely across their opposed, epicycloidal ends and generally parallel and opposed to the periphery of the respective bores 12, 13, 16 and 17. Each of the said grooves, 67, 67, etc. is symetrical about a plane generally perpendicular to the end of the impeller and parallel to the axis of rotation. Grooves 67, 67, etc. communicate with longitudinal face grooves, 68, 68, etc. having generally the same shape as grooves 67 and being generally parallel to each other extending from the central portion of the impeller on each side thereof outwardly in opposite directions toward the epicycloidal ends thereof. The respective grooves 67, 67, etc. and 68, 68, etc. define a labyrinth-type seal which does not require an oil lubricant.

Rotatably mounted within block bores 14 and 15 are engine impellers 69 and 70. Each of the engine impellers 69 and 70 is mounted respectively on shafts 33 and 34 and 50, 50. The engine impellers 69 and 70 are of a generally cycloidal configuration comprised of a pair of opposed, hypocycloidal curves comunicating with and smoothly joining a pair of opposed and turned or slightly cropped epicycloidal curves. As in the case of the respective compressor impellers, the engine impellers 69 and 70 have a longitudinal or long diameter slightly less than the diameter of the respective bores 14 and 15 in which they are rotatably mounted. Each engine impeller 69 and 70 is provided with a plurality of generally parallel grooves 71 of a generally semi-circular configuration on their opposed flat faces 72, 72 extending outwardly in opposite directions from their central portions. The grooves 71 communicate with a plurality of generally parallel end grooves 73 located in the cropped or turned epicycloidal ends of the said impellers. The end grooves 73 are oriented at approximately a 40° angle from the normal, the grooves 73 on impeller 69 facing in a generally clockwise direction and the corresponding grooves 73 on the opposite impeller 70 facing in a generally counterclockwise direction. The grooves 71 and 73 on the engine impellers form a labyrinth-type seal which requires no oil. In addition, the end grooves 73 provide for efficient use of kinetic energy of escaping gases to increase overall engine efficiency. This phase of the operation of my engine will be described in more detail below.

The upper peripheral interior surface of the engine bores 14 and 15 are provided with a plurality of recessed grooves 74 cut into the block 11 generally parallel to the axis of the bore. The grooves 74 in the block 11 in bore 14 are oriented at approximately a 40° angle from the normal in a generally clockwise direction, whereas, the corresponding grooves 74 in the opposite bore 15 are disposed at approximately a 40° angle from the normal in a generally counterclockwise direction. To insure an even more gas tight seal, all of the impellers, both the compressor impellers 61, 62, 63 and 64 and the engine impellers 69 and 70 are provided with an annular flange 75 on each face of the impeller concentric with its center of rotation. The front head 18 is provided with a corresponding circular groove 76 adapted to receive the annular flange 75 about each of the respective bores 49, 49, etc. Similarly, the rear head 19 is provided with a plurality of annular grooves 77 adapted to accommodate the opposite annular flanges 75 of the respective impellers about each of the respective bores 25, 26, 27, 28, 29, and 30. This structure constitutes another type of labyrinth seal which requires no grease or oil. Each of the engine bores 14 and 15 is provided with a plurality of radial grooves 78 cut into the rear head 19 forming a back face to the bore. The grooves 78 are generally semi-circular in configuration and those in the rear head 19 facing bore 14 are disposed at an angle of approximately 40° from the normal and communicate with the respective grooves 74 in the block 11. Similarly, the grooves 78 in the head 19 in back of the bore 15 are generally semi-circular in configuration and disposed at an angle of approximately 40° to the normal in a generally counterclockwise direction and communicate with the grooves 74 in the block 11 in that bore.

Each exhaust port 21 and 22 is provided with a pressure relief valve 79 which will release exhaust gases only when the pressure in the port reaches a predetermined level. Similarly, each fuel injection unit 53 is adapted to admit fuel at relatively high pressures and may have any one of a number of well-known structures.

My rotary engine operates generally by the rotation of the respective compressor impellers 61, 62, 63 and 64 drawing air into the bores of the block 11 through ports 23 and 24. The compressor or blower impellers compress the air to approximately two atmospheres from whence it is delivered into the space between the engine impellers 69 and 70 in engine bores 14 and 15. The convergence of the engine impellers 69 and 70 compresses the air to its highest level and actuates the fuel injection units 53 which deliver a stream of fuel, either gasoline or kerosene into the compressed air. The charge is then delivered to a combustion chamber defined by the space between the engine impellers 69 and 70 as they rotate to a so-called neutral position. The air and fuel charge is then transported by contrarotation of the engine impellers 69 and 70 through approximately 15° at which instant the said charge is caused to fire by means of a conventional spark plug or glow plug.

When the engine impellers are 15° past their neutral or zero position, the combustion chamber defined by the space therebetween is completely sealed as the charge is ignited. Combustion of the charge of fuel and air creates an enormous pressure, three or four times the compression pressure resulting in an unbalanced force about the center of rotation of the engine impellers. The resulting torque is transmitted through the respective gears 37, 38, 39, 40, 41 and 42 to the other impellers, both engine and compression and through gear 43 to drive gear 47 which powers drive shaft 45. Once the engin has started, it can operate on the diesel like principle of firing successive air and fuel charges by compression and exposure momentarily to hot exhaust gases from the previous combustion, this during the last 15° of rotation of a cycle. Although the flame of the earlier combustion phase will be extinguished, the temperature of the exhaust gases will be high enough to ignite the new air and fuel charge.

Each power pulse is effective during 90° of rotation of the impellers. The apparent loss of 15° of rotation at the start of each combustion cycle is regained at the end of the cycle because the first and last cycles overlap by 15°. A continuous flow of power results since there are four power pulses during each 360° of revolution of the impellers.

Figure 10:
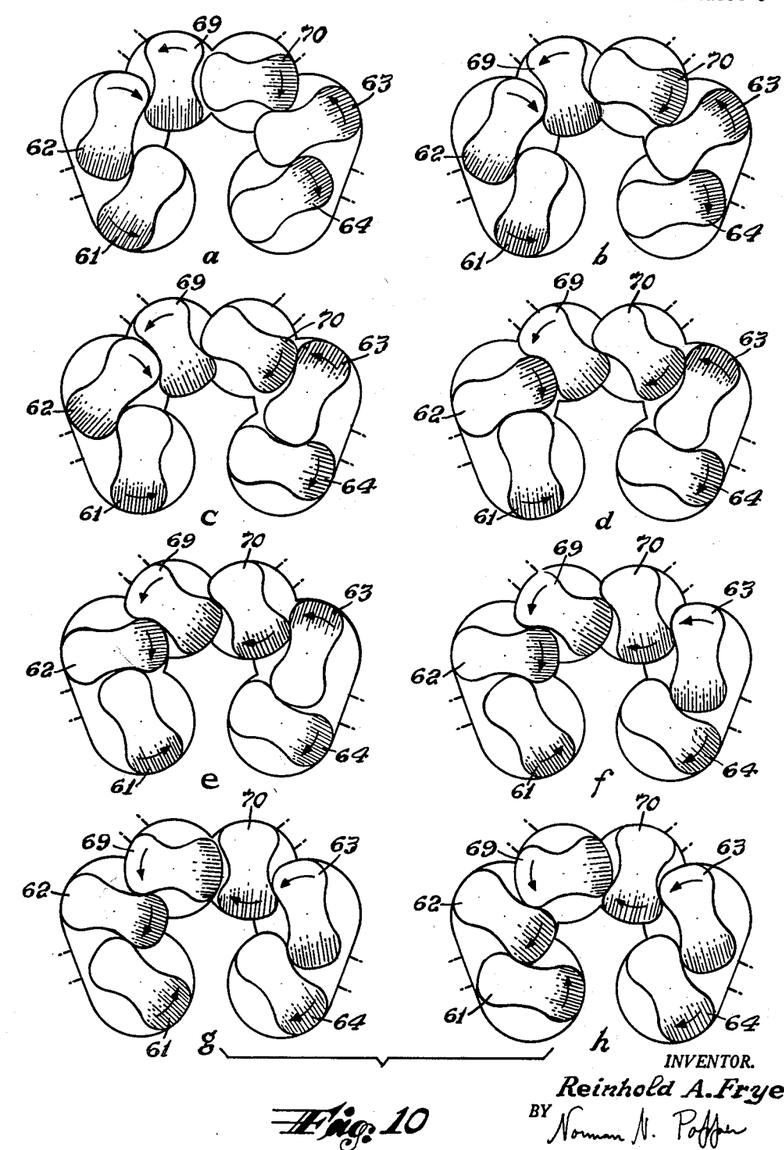
FIGURE 10 is a plurality of side elevational cross-sectional views of my rotary engine showing the respective positions of the impellers in sequence through various phases of the operation of the engine.
Figure 11:
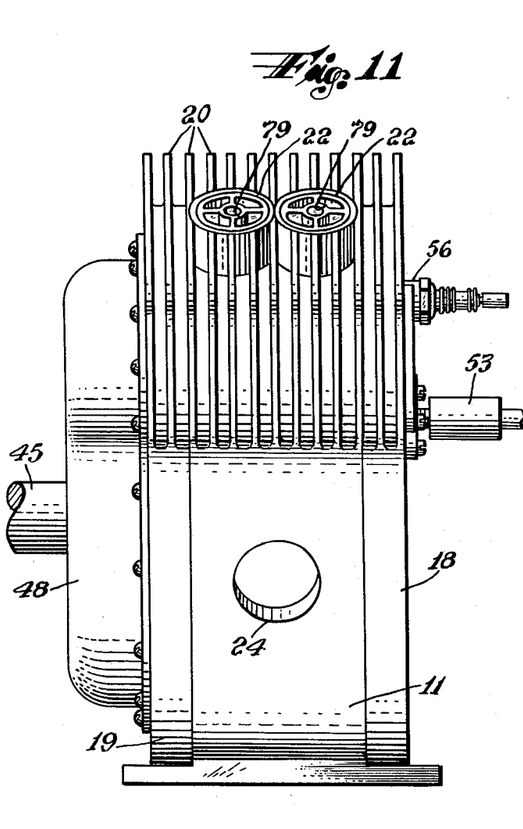
FIGURE 11 is an end elevational view of my engine showing the front and rear heads, the block and the intake and exhaust ports.

Specifically referring to FIGURE 10, there are shown a plurality of side elevational views of the block and impellers in schematic form showing a sequential operation of my engine. In FIGURE 10a, the engine impellers 69 and 70 are in their neutral or zero position, impeller 69 being in a 90° position to the horizontal and impeller 70 being parallel to the horizontal. In this position, there has been a substantial compression of the gas between the two engine impellers 69 and 70 and the charge of fuel is being introduced. It should be noted that the block 11 and bores 14 and 15 together with the engine impellers 69 and 70 are so designed structurally that there is a minute passage communicating between the space between the respective engine impellers and the space between engine impellers 70 and the exhaust port 22. Exhaust valve 79 is open and the pressure within the so-called exhaust chamber defined by bore 15 and engine impeller 70 is above atmospheric. Therefore, some of the air and fuel charge moves outwardly toward the exhaust port. This helps to spread the fuel charge away from the injector unit 53. The compressor impellers 61 and 62 are diverging opposite intake port 23 as are compressor impellers 63 and 64 opposite intake port 24. The space defined by bore 12 and compression impeller 61 represents a charge of air which is being transported to a compression stage. The space defined between the impeller 62, bore 13 and impeller 61 represents a charge of air which has been precompressed and is being delivered to the final compression and combustion phase. Similarly, the space between impeller 64, bore 17 and impeller 63 represents a charge of air which is being precompressed and being delivered toward the combustion chamber. It should be noted, that because of the epicycloidal configuration of the respective combustion and engine impellers, there is a close contact between impellers 61 and 62, impellers 62 and 69, impellers 70 and 63 and impellers 63 and 64.

In FIGURE 10b, all of the impellers have rotated 15° from their position shown in FIGURE 10a. The combustion chamber has just fired and is represented by the respective engine impellers 69 and 70 and bore 14. It should be noted that there is now close contact between engine impeller 70 and bore 15 closing off the exhaust chamber defined by impeller 70 and bore 15 and communicating with exhaust port 22. It should be noted, however, that immediately prior to the closing of the said exhaust chamber from the combustion chamber, hot gases from the previous combustion cycle have caused or may have caused the combustion chamber to fire. It should be noted also that it is the cropped epicycloidal configuration of engine impellers 70 which permits closure of the combustion chamber after 15° rotation of the respective impellers. The pressure in the exhaust chamber opposite exhaust port 22 will steadily rise as the engine impeller 70 continues to rotate since the volume defined thereby continually decreases. This will cause an opening of exhaust valve 79 and the release of the exhaust gases. Similarly, the exhaust chamber on the opposite side of the engine defined by the space between engine impeller 69, compression impeller 62 and bore 14 is open by reason of high pressure and the exhaust gases therein have been almost completely scavengered through exhaust valve 79 in port 21. The intake phase of operation of the engine is proceeding in the fashion described with respect to FIGURE 10a.

In FIGURE 10c, the respective impellers have moved an additional 15° in the direction of the arrows. The extreme rise in pressure in the combustion chamber has created an unbalanced force which causes the engine impellers 69 and 70 to contrarotate. This force is transmitted to the respective combustion impellers and the power output shaft. Exhaust gases continue to be forced through exhaust valve 79 in port 22 whereas engine impeller 69 has virtually closed off exhaust valve 79 in the opposite port 21. The respective air intake chambers continue to take in air. However, it should be noted that the precompressed air charge trapped between compression impellers 61 and 62 and bore 13 is now being transferred to bore 14 and further contained by engine impeller 69.

In FIGURE 10d, the combustion chamber defined by engine impeller 69 and 70 and bore 14 continues to expand under the force of the burning gases. There has been a virtually complete delivery of precompressed air from compression impellers 61 and 62 to the engine impeller 69, the same being trapped between engine impeller 69, compression impeller 62 and bores 13 and 14. On the opposite side of the engine a precompressed charge of air has been delivered to the space between engine impeller 70 and bore 15 and is contained therein by the opposite engine impeller 69. As this space further reduces, the pressure increases.

In FIGURE 10e, the respective impellers have further rotated 15° in the direction of the arrows. The initial combustion chamber has increased in volume to approximately its maximum and its energy spent. The opposite side of the engine is causing an increase of air pressure in a precompression chamber defined by bore 15, engine impeller 70 and engine impeller 69. Of course, there continues to be further intake of air through air intake ports 23 and 24 as described above.

In FIGURE 10f, the final compressions of the next charge of air is being completed, the compression chamber being defined by the space between engine impellers 69 and 70 and bore 15.

In FIGURE 10g the respective impellers have rotated an additional 15° in the direction of the arrows. The respective impellers have now rotated 90° from the zero or neutral position disclosed in FIGURE 10a. As in the case of FIGURE 10a the space defined between the respective engine impellers 69 and 70 and confined by bore 15 is at the stage of fuel injection and final compression. The new combustion chamber defined thereby communicates momentarily with the extremely hot gases from the previous combustion defined by bore 14 and engine impeller 69. As in the case of the phase shown in FIGURE 10a, there is a momentary migration of gases toward this exhaust chamber which aids in the distribution of the fuel charge which is being admitted. In addition, the flash back of extremely hot gases in the exhaust chamber will ignite the new charge of fuel an instant before there is a sealing of the exhaust chamber by rotation of engine impeller 69.

FIGURE 10h shows the respective impellers at a position of further rotation in the amount of 15°. The position shown in FIGURE 10h is 90° displaced from the position shown in FIGURE 10b. The combustion chamber is now firing and is defined by the enclosure of engine impellers 69 and 70 and bore 15. The rest of the impellers are functioning in the precise manner as those in FIGURE 10b but on the opposite side of the engine.

It is extremely important to note that because of the cycloidal configuration of the compression impellers and the modified cycloidal configuration of the engine impellers, there is always an engagement between the respective impellers excepting at the neutral position shown in FIGURE 10a and 10g. There are, therefore, defined separate and distinct compartments or chambers between the respective impellers and the respective bores. By controlling the degrees of cropping of the engine impellers, the combustion chamber defined by the respective engine impellers and the respective bores 14 and 15 may be caused to close at any particular degree of rotation of the engine. Thus, there may be maintained a precise control of the time and phase relationship of the operation of the engine.

Figure 1:
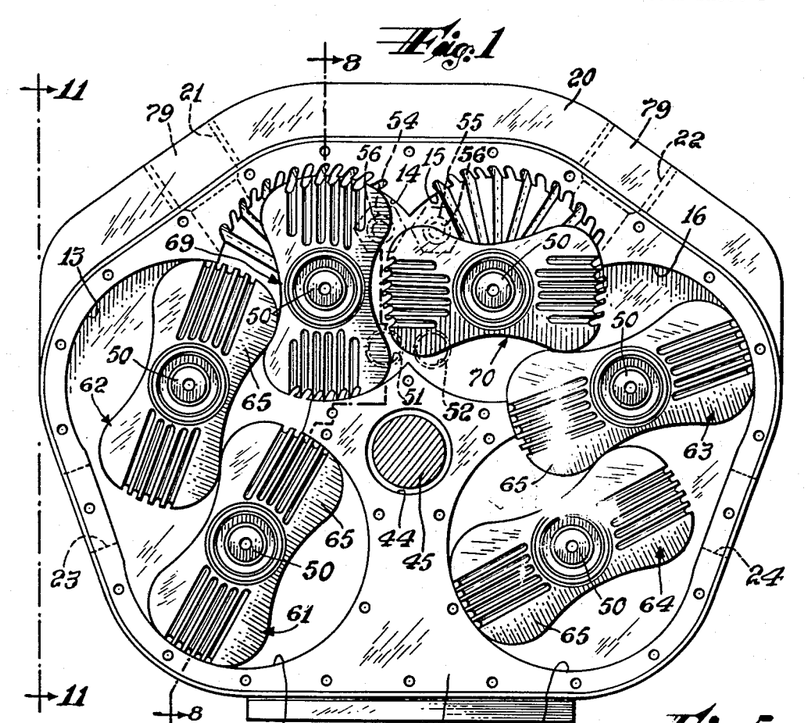
FIGURE 1 is a front elevational cross-sectional view of my rotary engine showing the engine block, the rear head, and the respective impellers.
Figure 2:
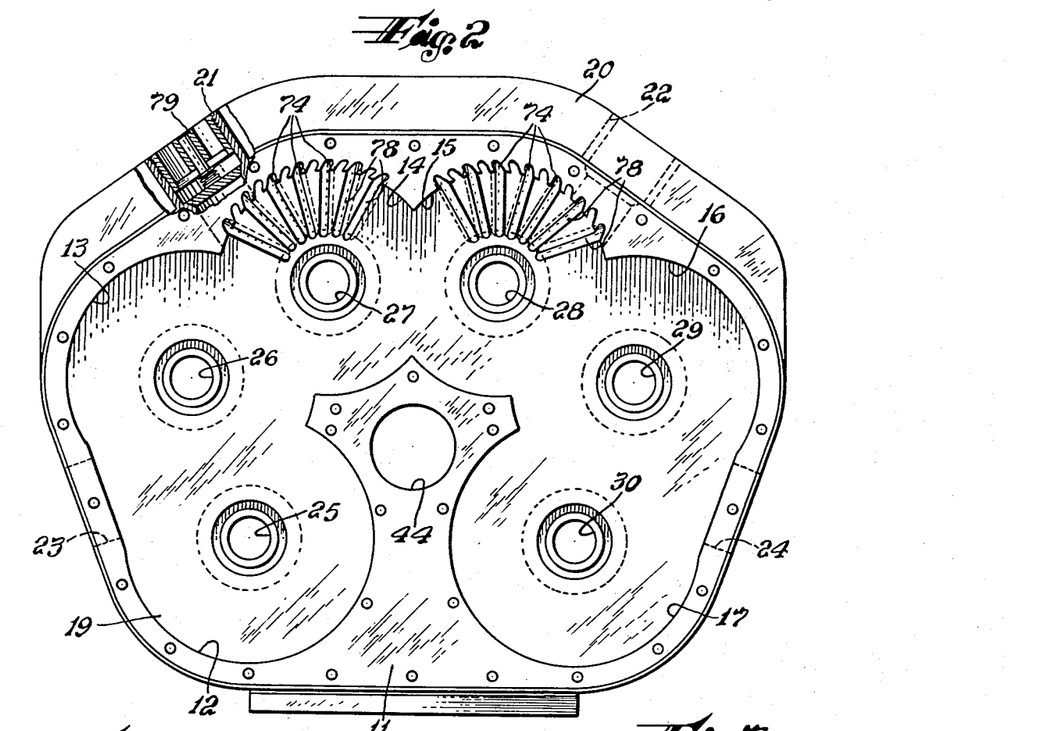
FIGURE 2 is a front elevational cross-sectional view of my engine shown in FIGURE 1 with the impellers removed.
Figure 3:
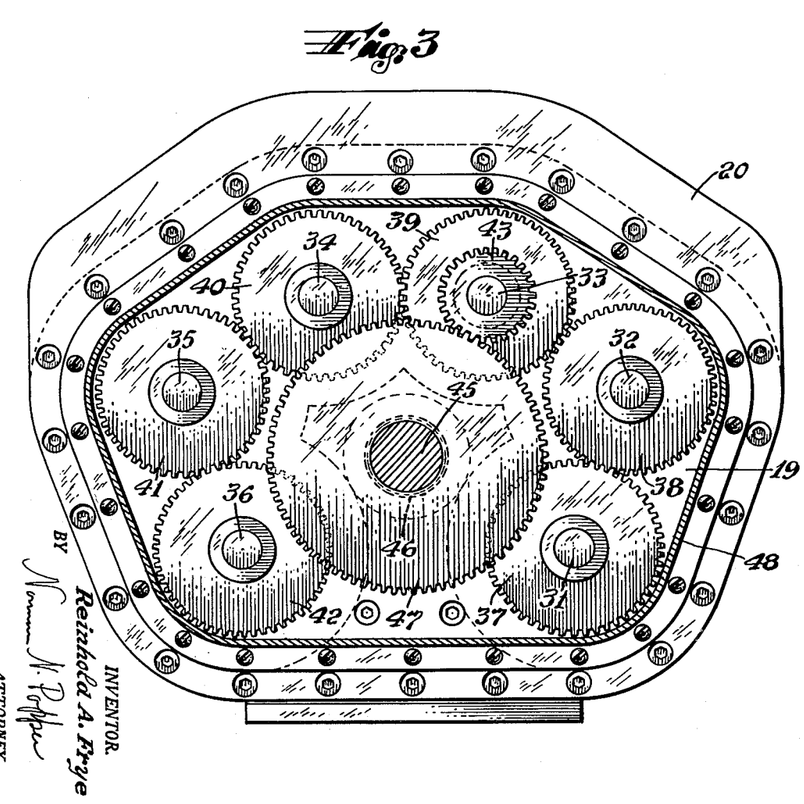
FIGURE 3 is a rear elevational cross-sectional view of my engine with the gear cover removed.
Figure 4:
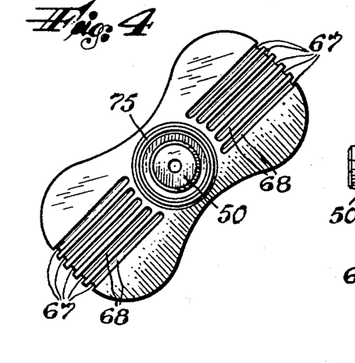
FIGURE 4 is a side elevational view of a compressor impeller.
Figure 5:
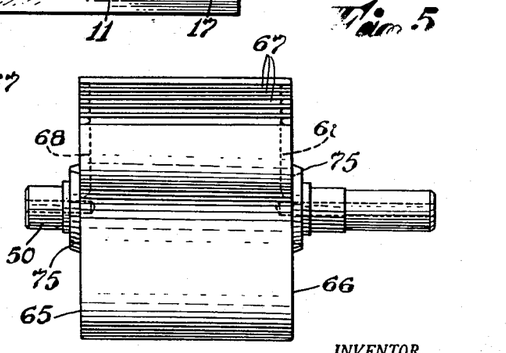
FIGURE 5 is an end elevational view of the compressor impeller shown in FIGURE 4.
Figure 6:
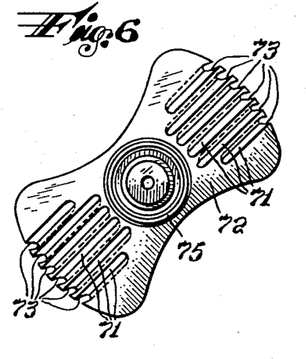
FIGURE 6 is a side elevational view of an engine impeller.
Figure 7:
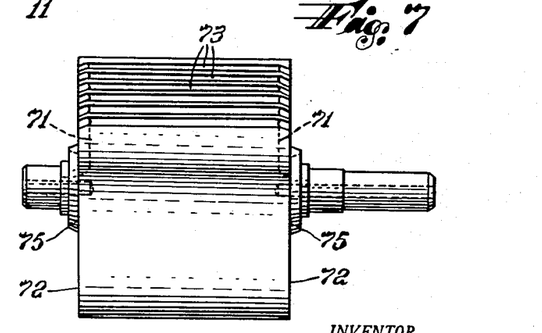
FIGURE 7 is an end elevational view of the engine impeller shown in FIGURE 6.
Figure 8:
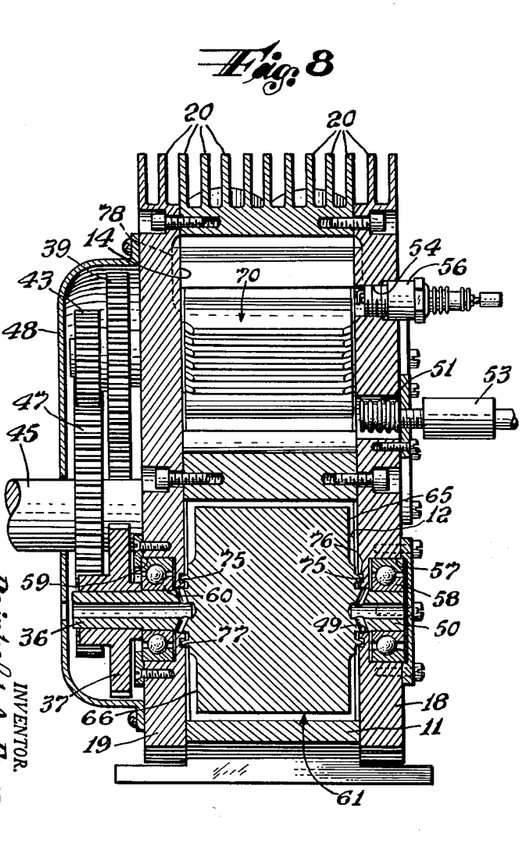
FIGURE 8 is an end elevational cross-sectional view of my rotary engine taken along line 8—8 in FIGURE 1 looking in the direction of the arrows.
Figure 9:
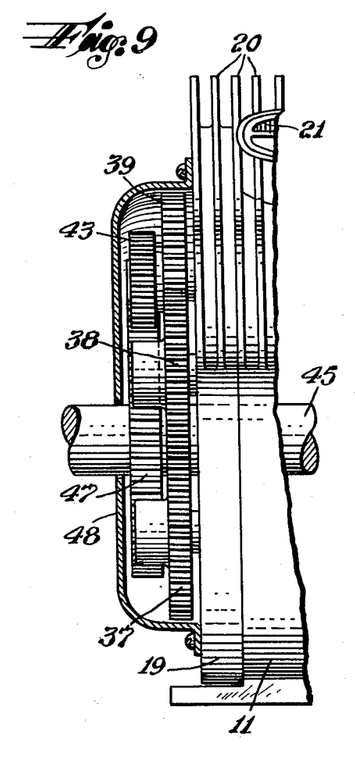
FIGURE 9 is a partial end elevational cross-sectional view of my rotary engine showing the block, the rear head and the intermeshed gears attached to the impeller shafts and engaged to a drive gear.

As noted earlier, the labyrinth seal formed between the grooves 74 and 78 in the block 11 and heads 18, 19 respectively and the grooves 73 and 71 on the respective engine impellers 69 and 70 which collectively form a labyrinth-type seal also converts kinetic energy of escaping exhaust gases into kinetic energy of rotation of the impellers. This may be seen by an examination of the sequence views in FIGURE 10. The high pressure created by the burning fuel in the combustion chamber tends to escape through that clearance between the respective engine impellers 69 and 70 and the bores 14 and 15. As may be more clearly seen in FIGURE 1, gas escaping from the compression or combustion chamber around the engine impeller 69 collides with the groooves 71 and 73 in the engine impeller and the grooves 74 and 78 in the block 11 and heads 18, 19 respectively. These grooves are angled at approximately 40 to the normal and are disposed in a generally clockwise direction. The result is that the gases tend to collide with the walls of the groove building up pressure therein before escaping to the succeeding grooves. The energy of the collision of this gas stream and the pressure is built up in the chamber defined by the opposing grooves, 73 and 74 in the periphery or cycloidal end of the engine impeller 69 or the grooves 71 and 78 in the side of the engine impeller and the head 18 or 19. The energy thus expended by the escaping gases is converted into kinetic energy of rotation of the impellers.

A similar phenomenon occurs with gases escaping between the opposite engine impeller 69 and the bore 15. This vastly enhances the efficiency of the engine operation and makes almost full use of the potential energy thereof.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A rotary engine comprising
    a block having at least two communicating engine bores and a plurality of compressor bores, each engine bore communicating with at least one compressor bore, each of the engine and compressor bores extending transversely through the block,
    a front head attached to the block overlying the respective engine and compressor bores,
    a rear head attached to the opposite side of the block underlying the respective engine and compressor bores,
    an engine impeller rotatably mounted in each engine bore, each engine impeller rotatable in timed relationship to and in periodic meshed engagement with the engine impeller in the communicating engine bore,
    a compressor impeller rotatably mounted in each compressor bore, each compressor impeller mounted in a compressor bore communicating with an engine bore rotatable in meshed engagement with the engine impeller mounted in said engine bore,
    a shaft on each engine and compressor impeller extending through the rear head,
    means for connecting the respective engine impeller shafts with each other,
    means for introducing air into a plurality of the compressor bores,
    means for introducing fuel into each engine bore,
    means for discharging exhaust gas from each engine bore,
    means in each engine bore for igniting the fuel,
    means for connecting at least one of the engine impeller shafts to power output means.

2. A rotary engine comprising
    a block having at least two communicating engine bores and a plurality of compressor bores, each engine bore communicating with at least one compressor bore, the engine and compressor bores extending transversely through the block,
    a front head attached to the block overlying the respective engine and compressor bores,
    a rear head attached to the opposite side of the block underlying the respective engine and compressor bores,
    an engine impeller rotatably mounted in each engine bore, each engine impeller having a configuration defined by a plurality of alternate concave hypocycloidal curves smoothly connected to a plurality of convex epicycloidal curves, at least a portion of each of the said epicycloidal curves having been cropped, the said engine impellers rotatable in timed relationship to and in periodic meshed engagement with each other,
    a compressor impeller rotatably mounted in each compressor bore, each compressor impeller having a configuration defined by a plurality of opposed concave, hypocycloidal curves smoothly connected to a pair of opposed convex, epicycloidal curves, each compressor impeller mounted in a compressor bore communicating with an engine bore rotatable in meshed engagement with the engine impeller mounted in said engine bore,
    a shaft on each engine and compressor impeller extending through the rear head,
    means for connecting the engine impeller shafts with each other, means for connecting each engine impeller shaft to the compressor impeller shaft adjacent to it, means for connecting each compressor impeller shaft to the compressor impeller shaft adjacent to it, means for connecting at least one of the respective impeller shafts to power output means, means for introducing air into at least one compressor bore intercommunicating with each engine bore, means for introducing fuel into each engine bore, and means in each engine bore for igniting the fuel.

3. A rotary engine comprising a block having at least two communicating engine bores and a plurality of compressor bores, each engine bore communicating with at least one compressor bore, the engine and compressor bores extending transversely through the block, a front head attached to the block overlying the respective engine and compressor bores, an engine impeller rotatably mounted in each engine bore, each engine impeller having a configuration defined by a pair of opposed concave, hypocycloidal curves smoothly connected to a pair of opposed convex, epicycloidal curves, at least a portion of each of the said epicycloidal curves having been cropped, each of said engine impellers rotatable in timed relationship to and in periodic meshed engagement with each other, a compressor impeller rotatably mounted in each compressor bore, each compressor impeller having a configuration defined by a pair of opposed concave hypocycloidal curves smoothly connected to a pair of opposed convex, epicycloidal curves, each compressor impeller mounted in a compressor bore communicating with an engine bore rotatable in meshed engagement with the engine impeller mounted in said engine bore, a shaft on each engine and compressor impeller extending through the rear head, means for connecting the engine impeller shafts with each other for timed rotation, means for connecting each engine impeller shaft to the compressor shaft adjacent to it, means for connecting each compressor impeller shaft to the compressor impeller shaft adjacent to it, means for connecting at least one of the respective impeller shafts to power output means, the block having an air intake passage communicating between its exterior and at least one of the compressor bores intercommunicating with one of the engine bores and another air intake passage communicating between its exterior and at least one of the other compressor bores intercommunicating with the other engine bore, the block having a plurality of exhaust ports communicating between its exterior and the respective engine bores, a fuel injector mounted in the front head opposite each engine bore and adapted to introduce fuel at greater than atmospheric pressure, and means in each engine bore for igniting the fuel.

4. A rotary engine in accordance with claim 2 in which the block is provided with a plurality of transverse grooves in the periphery of each engine bore, the front and rear head are each provided with a plurality of radial grooves opposite each engine bore communicating with the said transverse grooves, each engine impeller is provided with a plurality of longitudinal grooves on both sides thereof extending generally from the central portion of the said impeller outwardly to each cropped epicycloidal end and positioned generally parallel and opposed to the radial grooves in the front and rear head opposite each engine bore, and each engine impeller is provided with a plurality of transverse grooves in each cropped epicycloidal end thereof communicating with said longitudinal grooves and positioned generally parallel and opposed to the transverse grooves in the block.

5. A rotary engine comprising the structure in accordance with claim 4 in which, the transverse grooves in the block in one engine bore are inclined at an angle to the normal of the block within that engine bore, and the transverse grooves in the block in the communicating engine bore are inclined at an angle to the normal of the block within that engine bore in a direction opposite the inclination of the transverse grooves in the first said engine bore, the transverse grooves in each engine impeller are inclined at an angle to the normal of the cropped epicycloidal ends thereof in the same direction as the transverse grooves in the block in the engine bore in which it is mounted, the radial grooves in the front and rear head in each engine bore are inclined at an angle to the normal thereof in the same direction as the transverse grooves in the block in that engine bore, the longitudinal grooves in each engine impeller are inclined at an angle to the normal thereof in the same direction as the opposed radial grooves in the front and rear head in that engine bore.

6. A rotary engine comprising the structure in accordance with claim 4 in which each compressor impeller is provided with a plurality of transverse grooves in each cropped epicycloidal end and a plurality of generally parallel longitudinal grooves extending from the central portion thereto to each cropped epicycloidal end on both sides thereof and communicating with the said transverse grooves.

7. A rotary engine comprising the structure in accordance with claim 5 in which each compressor impeller is provided with a plurality of transverse grooves in each epicycloidal end and a plurality of generally parallel longitudinal grooves extending from the central portion thereof to each cropped epicycloidal end on both sides thereof and communicating with the said transverse grooves.

8. A rotary engine comprising the structure in accordance with claim 4 in which each of the engine and compressor impellers is provided with an annular flange on each side thereof concentric with its center of rotation, and the front and rear head is provided with an annular groove in each bore concentric with the center of rotaion of the impeller mounted in the bore which receives the annular flange on each side of the said impeller.

9. A rotary engine comprising the structure in accordance with claim 5 in which each of the engine and compressor impellers is provided with an annular flange on each side thereof concentric with its center of rotation, and the front and rear head is provided with an annular groove in each bore concentric with the center of rotation of the impeller mounted in the bore which receives the annular flange on each side of the said impeller.

10. A rotary engine comprising the structure in accordance with claim 6 in which each of the engine and compressor impellers is provided with an annular flange on each side thereof concentric with its center of rotation, and the front and rear head is provided with an annular groove in each bore concentric with the center of rotation of the impeller mounted in the bore which receives the annular flange on each side of the said impeller.

11. A rotary engine comprising the structure in accordance with claim 7 in which each of the engine and compressor impellers is provided with an annular flange on each side thereof concentric with its center of rotation, and the front and rear head is provided with an annular groove in each bore concentric with the center of rotation of the impeller mounted in the bore which receives the annular flange on each side of the said impeller.

References Cited by the Examiner

UNITED STATES PATENTS

| | | | |
|---|---|---|---|
| 1,372,750 | 3/21 | Hejha | 16—20 |
| 2,920,610 | 1/60 | Brelle | 123–13 |

FOREIGN PATENTS

| | | |
|---|---|---|
| 1,222,565 | 6/60 | France. |
| 371,106 | 3/23 | Germany. |
| 425,689 | 2/26 | Germany. |
| 609,707 | 2/35 | Germany. |
| 282,752 | 5/28 | Great Britain. |
| 325,425 | 2/30 | Great Britain. |

OTHER REFERENCES

German Printed Application (Hubrich) M 12,659, Sept. 6, 1956.

JULIUS E. WEST, *Primary Examiner.*